(12) United States Patent
Fuesser

(10) Patent No.: US 6,503,303 B2
(45) Date of Patent: Jan. 7, 2003

(54) ENCLOSURE FOR AN AIR ASPIRATING MACHINE

(75) Inventor: Rolf Fuesser, Bad Herrenalb (DE)

(73) Assignee: Filterwerk Mann & Hummel GmbH, Ludwigsburg (DE)

( * ) Notice: Subject to any disclaimer, the term of this patent is extended or adjusted under 35 U.S.C. 154(b) by 0 days.

(21) Appl. No.: 09/843,275

(22) Filed: Apr. 23, 2001

(65) Prior Publication Data

US 2002/0002906 A1 Jan. 10, 2002

(30) Foreign Application Priority Data

Apr. 22, 2000 (DE) ......................................... 100 20 109

(51) Int. Cl.[7] .............................................. B01D 46/10
(52) U.S. Cl. ............................. 96/380; 96/381; 96/383; 96/386; 55/385.1; 55/458; 181/229; 181/403
(58) Field of Search .......................... 96/380, 381, 382, 96/384, 386, 388; 417/312, 902; 181/229, 403; 55/385.1, 458

(56) References Cited

U.S. PATENT DOCUMENTS

| 4,050,237 A | * | 9/1977 | Pau et al. ..................... 55/486 |
| 4,302,224 A | * | 11/1981 | McCombs et al. ............ 96/128 |
| 4,313,715 A | * | 2/1982 | Richardson, Jr. ........... 417/312 |
| 4,810,269 A | * | 3/1989 | Stackhouse et al. .......... 96/381 |
| 5,205,719 A | * | 4/1993 | Childs et al. ................ 417/312 |
| 5,378,254 A | * | 1/1995 | Maly et al. .................... 96/423 |
| 5,878,590 A | * | 3/1999 | Kadle et al. .................. 96/125 |

* cited by examiner

Primary Examiner—David A. Simmons
Assistant Examiner—Minh-Chau T. Pham
(74) Attorney, Agent, or Firm—Crowell & Moring LLP

(57) ABSTRACT

An enclosure for an air aspirating machine, such as a compressor 11 for a fuel cell drive 13, which represents a closed volume, so that said volume can be used acoustically for the air that is being drawn in. An air intake 17 is extended into the enclosure 12, which is made of a sound damping and absorbing material 18, so that the resonant cavity 19 acts as a series resonator. The air is drawn in via an air inlet 21 of the compressor 11. Alternatively, the resonant cavity can also be used as a parallel resonator in that the intake path for the air is sealed within the enclosure 12 and is provided only with sound communicating openings to the resonant cavity.

16 Claims, 1 Drawing Sheet

ENCLOSURE FOR AN AIR ASPIRATING MACHINE

BACKGROUND OF THE INVENTION

The present invention relates to an enclosure for an air aspirating machine, particularly for a compressor for a fuel cell drive. The invention further relates to an assembly, which, in addition to the aforementioned enclosure, also comprises the air aspirating machine.

It is known to provide devices that emit structure-borne noise with an enclosure, which dampens the noise emitted by these devices and also, if lined with absorption material, absorbs it. These enclosures are preferably made of acoustically insulating materials that do not let the energy pass through to the surroundings.

Such enclosures, however, require additional clearance. In automotive engineering the sound emitting machines, for instance the internal combustion engine or the compressor for a fuel cell drive, are arranged in tight spaces. If an enclosure as described is provided, the necessary clearance must be obtained, e.g., by reducing acoustically effective volumes in the inlet path of the air aspirating machine. In most cases, therefore, the enclosure represents an acoustic compromise.

SUMMARY OF THE INVENTION

It is the object of the present invention to provide an enclosure for an air aspirating machine, or an assembly comprising such an enclosure and the air aspirating machine, while making optimal use of the volume that is used to dampen the noise.

These and other objects are achieved in accordance with the present invention by providing an enclosure for an air aspirating machine which draws in air along an air intake path extending through a wall of the enclosure, wherein the enclosure completely encompasses the air aspirating machine, and the enclosure is sealed relative to its surroundings so as to form a resonant cavity which communicates with the air intake path of the air aspirating machine.

In accordance with a further aspect of the invention, the objects are achieved by providing an assembly comprising an air aspirating machine and an enclosure in which the air aspirating machine is installed, wherein the enclosure is sealed relative to its surroundings so as to form a resonant cavity, the resonant cavity communicating with an air intake path of the air aspirating machine, and the air aspirating machine having an air intake which extends through a wall of the enclosure.

The enclosure according to the invention completely encompasses the air aspirating machine. This makes it possible to achieve optimal sound insulation with respect to the structure-borne noise emitted by the air aspirating machine. The enclosure according to the invention is characterized in that it is completely sealed off from the surroundings, so that the volume it encloses cannot communicate with the surroundings. This creates a resonant cavity that can communicate only with the air intake path of the machine. The volume encompassed by the enclosure can thus be simultaneously used as an acoustically effective volume for the inlet noise of the air aspirating machine. Thus, the enclosure has a dual function. The sound damping and sound absorbing properties of the enclosure material and the resonator characteristics of the enclosed volume are used simultaneously.

The enclosed volume will be quite large compared to the volumes that are usually available for acoustic measures in the intake path. It is therefore particularly suitable for reducing low-frequency noise components in the intake noise. The structural components provided within the enclosure result in a complex geometry of the resonator volume. This has a broadband noise reduction effect when considered over the frequency of the intake noise.

The enclosure according to the invention is particularly suitable for compressors, such as those used in fuel cell drives. The requirements for high volumetric efficiency and the reduction in the air's ability to absorb moisture lead to the selection of compressors with a very high power density. As a function of the type of construction, these compressors emit a loud noise both at the intake opening and through the housing walls. The enclosure according to the invention can effectively dampen both the structure-borne noise emitted through the housing walls of the compressor and the noise in the intake opening. This makes it possible to adjust the compressor noise to the noise level of the remaining functions of the fuel cell drive, so that it is not noticeable as a disagreeable and disturbing noise.

In accordance with one specific embodiment of the invention, the air intake that leads into the enclosure is provided with an air filter. Filtering the air is necessary, for instance, in internal combustion engines and fuel cell drives. The air filter is generally provided in a housing, which as an acoustic volume per se helps dampen the intake noise. The housing can either be separate or integrated into the enclosure or the volume encompassed by the enclosure.

A further advantageous embodiment of the invention is obtained if other sound emitting components are accommodated within the enclosure in addition to the air aspirating machine. This reduces the overall noise of the functional group, which, for instance, represents a motor vehicle. In this case, the enclosure acts in its sound damping and S absorbing capacity. Examples of other noise emitting components are turbochargers or electric motors.

One advantageous embodiment of the invention provides that the resonant cavity operate as a series resonator. This means that the air inlet opens out into the volume formed by the enclosure, and the air aspirating machine for its part has an intake opening. Thus, the air drawn in by the air aspirating machine must flow through the resonant cavity.

Another option provides that the resonator be used as a parallel resonator. In this case the air intake path from the air inlet to the air aspirating machine essentially forms a connected duct system, which must have some openings to the resonant cavity in order to be able to communicate with the resonant cavity.

Between the described modes of action as a series or as a parallel resonator, it is, of course, possible to provide other resonators in which the described effects are superimposed. It is feasible, for instance, to arrange the inlet opening of the air aspirating machine and the outlet opening of the air intake so close together that there is only a gap between the two openings leading to the resonant cavity.

It is advantageous to equip the air aspirating machine with a safety filter, which may be arranged on the air inlet of the air aspirating machine located within the resonant cavity. This safety filter can eliminate any dirt particles, which, due to a leak in the enclosure, may reach the resonant cavity despite prior filtering of the air drawn in. This increases the reliability of the entire unit and reduces the tightness requirements of the enclosure, respectively.

Another option to protect the air aspirating machine from dirt particles in the resonant cavity is to arrange a sound permeable wall in the air intake path, which communicates with the resonant cavity. This assures acoustic communication of the resonant cavity with the air intake path. The sound permeable wall can be made impermeable for any dirt particles and thus assumes a function similar to a safety filter.

The sound permeable wall can even be made absolutely air-tight. For instance, a membrane that is arranged in the walls of the intake path can transmit the sound vibrations from the interior of the intake path to the resonant cavity. Such a membrane is thus sound permeable even though there is no air exchange between the resonant cavity and the air intake path.

The sound permeable wall can be formed, in particular, by a flexible hose, which is installed as a line segment in the air intake path. Hoses with a foam-like structure, which are applied to a support hose, e.g., made of a woven fabric, are preferably used for this purpose. Such hoses represent a comparatively inexpensive semi-finished part, which can be readily integrated in the air intake path. This makes it possible to use the resonant cavity in the enclosure without any risk to the air aspirating machine. The arrangement of the hose furthermore increases the degree of geometric design freedom in arranging the air aspirating machine within the enclosure.

These and other features of preferred embodiments of the invention, in addition to being set forth in the claims, are also disclosed in the specification and/or the drawings, and the individual features each may be implemented in embodiments of the invention either individually or in the form of subcombinations of two or more features and can be applied to other fields of use and may constitute advantageous, separately protectable constructions for which protection is also claimed.

BRIEF DESCRIPTION OF THE DRAWINGS

The invention will be described hereinafter in further detail with reference to illustrative preferred embodiments shown in the accompanying drawings in which.

DETAILED DESCRIPTION OF PREFERRED EMBODIMENTS

Figure 1:
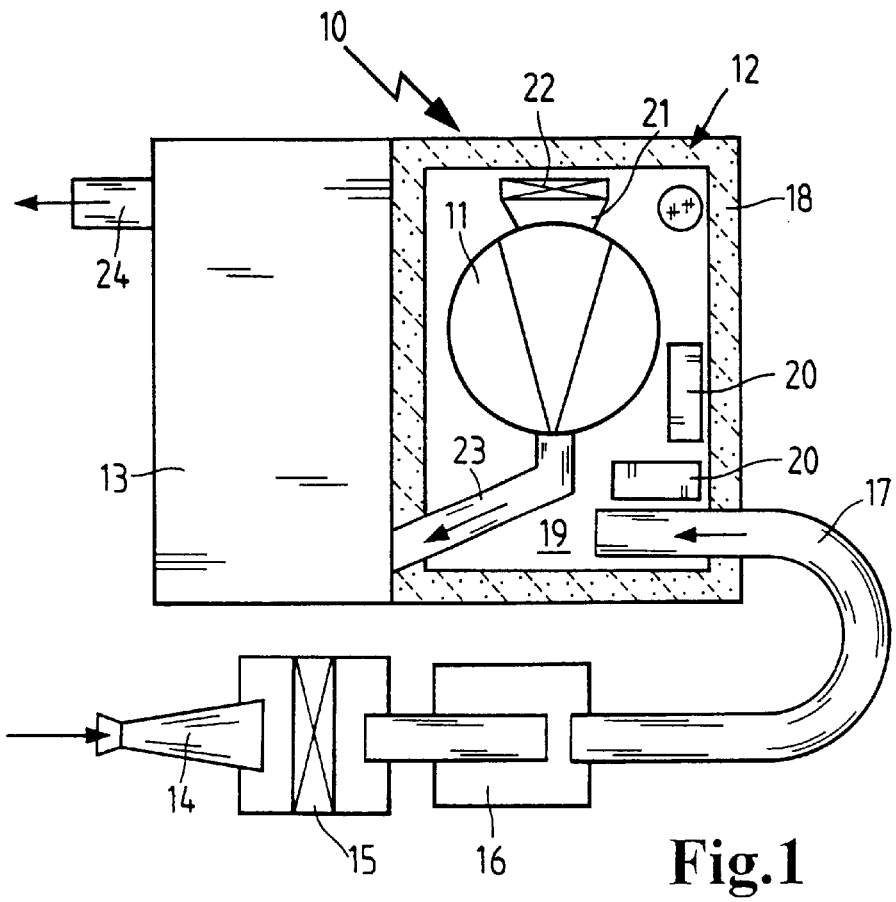
FIG. 1 is a schematic diagram of a fuel cell drive with an enclosure which functions as a series resonator.

In the assembled unit 10 of the invention, which comprises at least a compressor 11 and an enclosure 12, the air drawn in is supplied to a membrane stack 13, which serves as an energy source for a fuel cell drive. The air flows via an air intake 14 into an air filter 15 and from there via a sound absorber 16 to a line area identified as air intake 17, which leads through a wall 18 of the enclosure 12. The wall of the enclosure can, for instance, be made of a synthetic resin material (i.e., plastic) that is coated on the inside with an open-cell foam material.

The enclosure forms a resonant cavity 19 in which the compressor 11 and other sound emitting components 20 and are arranged. The compressor is provided with an air inlet 21, which is equipped with a safety filter 22. Air inlet 21 and air intake 17 are spaced far enough apart from one another so that the air drawn in must flow through the resonant cavity 19. Thus, the resonant cavity 19 acts as a series resonator.

After compression, the air is fed via a supply line 23 directly to the membrane stack. The air leaves the membrane stack through an outlet 24.

Figure 2:
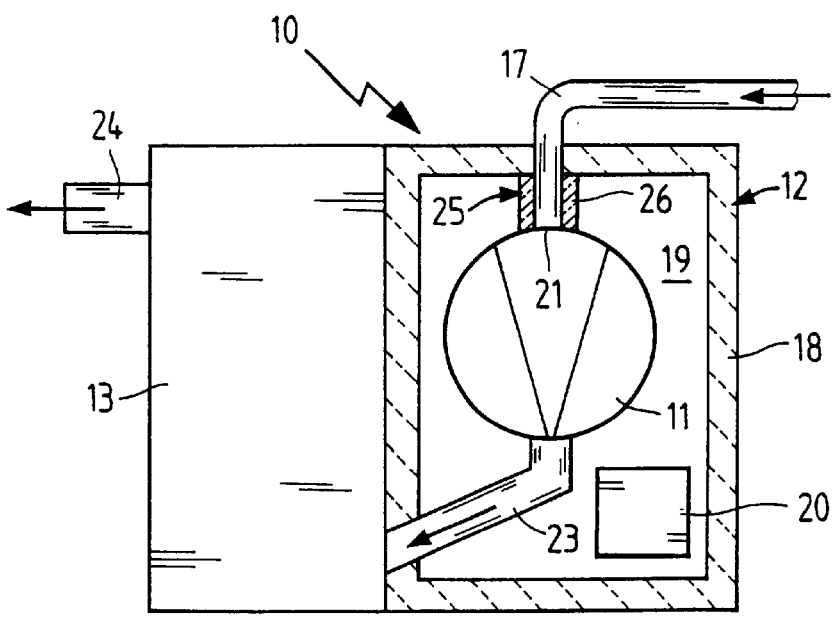
FIG. 2 is a schematic diagram depicting an arrangement according to FIG. 1 with an enclosure which functions as a parallel resonator.

FIG. 2 depicts an arrangement of the components described in FIG. 1, which results in the use of the resonant cavity 19 as a parallel resonator. The intake path of the air in front of air intake 17 is not illustrated, but may be exactly the same as that shown in FIG. 1. The air intake 17 is connected with the air inlet 21 of the compressor 11 by a hose 25 the wall of which acts as a sound permeable membrane 26. Through this wall, the resonant cavity 19 is connected in an acoustically effective manner with the intake path of the air for compressor 11.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

What is claimed is:

1. An enclosure for an air aspirating machine which draws in air along an air intake path extending through a wall of the enclosure, wherein said enclosure completely encompasses the air aspirating machine, and the enclosure is sealed relative to its surroundings so as to form a resonant cavity which communicates with the air intake path of the air aspirating machine, and wherein said air aspirating machine is a compressor for a fuel cell drive.

2. An assembly comprising an air aspirating machine and an enclosure in which said air aspirating machine is installed, wherein said enclosure is sealed relative to its surroundings so as to form a resonant cavity, said resonant cavity communicating with an air intake path of the air aspirating machine, and said air aspirating machine having an air intake which extends through a wall of said enclosure, and wherein said air aspirating machine is a compressor for a fuel cell drive.

3. An assembly according to claim 2, wherein the air intake is provided with an air filter.

4. An assembly according to claim 2, wherein in addition to the air aspirating machine, said enclosure contains at least one further component which emits sound.

5. An assembly according to claim 2, wherein the resonant cavity is configured as a series resonator with respect to the intake path of the air aspirating machine.

6. An assembly according to claim 5, further comprising a safety filter arranged in the air intake path of the air aspirating machine, wherein said safety filter is located in a part of the air intake path that is disposed within the resonant cavity.

7. An assembly comprising an air aspirating machine and an enclosure in which said air aspirating machine is installed, wherein said enclosure is sealed relative to its surroundings so as to form a resonant cavity, said resonant cavity communicating with an air intake path of the air aspirating machine, and said air aspirating machine having an air intake which extends through a wall of said enclosure, wherein the resonant cavity is configured as a parallel resonator with respect to the intake path of the air aspirating machine.

8. An assembly according to claim 7, wherein the resonant cavity is separated from the air intake path by a sound permeable wall.

9. An assembly according to claim 8, wherein said sound permeable wall is air-tight, so that the resonant cavity is sealed from the air intake path.

10. An assembly according to claim 9, wherein said sound permeable wall is formed by a flexible hose which constitutes a segment of the air intake path.

11. An assembly according to claim 2, wherein said enclosure is lined with a sound absorbing material.

12. An assembly according to claim 11, wherein said sound absorbing material is an open-cell foam.

13. An assembly according to claim 2, wherein the resonant cavity is configured as a parallel resonator with respect to the intake path of the air aspirating machine.

14. An assembly according to claim 13 wherein the resonant cavity is separated from the air intake path by a sound permeable wall.

15. An assembly according to claim 14, wherein said sound permeable wall is airtight, so that the resonant cavity is sealed from the air intake path.

16. An assembly according to claim 15, wherein said sound permeable wall is formed by a flexible hose which constitutes a segment of the air intake path.

* * * * *